United States Patent [19]

Skutnik et al.

[11] Patent Number: 5,455,087
[45] Date of Patent: Oct. 3, 1995

[54] COATING COMPOSITION FOR GLASS CONTAINERS

[75] Inventors: Bolesh J. Skutnik, New Britain; Harry L. Brielmann, Jr., West Hartford, both of Conn.

[73] Assignee: Ensign Bickford Optics Company, Simsbury, Conn.

[21] Appl. No.: 166,317

[22] Filed: Dec. 10, 1993

Related U.S. Application Data

[60] Continuation of Ser. No. 635,997, Dec. 28, 1990, abandoned, which is a division of Ser. No. 272,133, Nov. 16, 1988, Pat. No. 5,112,658.

[51] Int. Cl.$^6$ .................................................. B65D 11/16
[52] U.S. Cl. ..................... 428/34.7; 428/34.6; 428/430; 215/12.2; 427/302; 427/407.2; 427/372.2; 156/307.3
[58] Field of Search ........................... 428/34.6, 34.7, 428/442, 430, 435, 426, 429; 215/12.2, DIG. 6; 427/302, 407.2, 372.2; 156/307.3

[56] References Cited

U.S. PATENT DOCUMENTS

| | | | |
|---|---|---|---|
| 3,772,062 | 11/1973 | Shur et al. | 117/93.31 |
| 3,877,969 | 4/1975 | Tatsumi et al. | 428/216 |
| 3,899,611 | 8/1975 | Hall | 427/54 |
| 3,922,436 | 11/1975 | Bell et al. | 428/375 |
| 4,014,771 | 3/1977 | Rozenkranz et al. | 204/159.23 |
| 4,065,589 | 12/1977 | Lenard et al. | 428/431 |
| 4,084,021 | 4/1978 | Sandvig | 427/44 |
| 4,099,837 | 7/1978 | Vazirani | 350/96.29 |
| 4,125,644 | 11/1978 | Ketley et al. | 427/36 |
| 4,264,658 | 4/1981 | Tobias et al. | 428/35 |
| 4,273,799 | 6/1981 | Kamada et al. | 428/412 |
| 4,287,227 | 9/1981 | Kamada et al. | 427/54.1 |
| 4,319,811 | 3/1982 | Tu et al. | 351/166 |
| 4,371,566 | 2/1983 | Russell | 427/531 |
| 4,451,329 | 5/1984 | Batchelor et al. | 156/660 |
| 4,511,209 | 4/1985 | Skutnik | 350/96.34 |
| 4,513,061 | 4/1985 | Kawakubo et al. | 428/429 |
| 4,707,076 | 11/1987 | Skutnik et al. | 350/96.34 |
| 4,741,958 | 5/1988 | Bishop | 428/394 |
| 4,749,614 | 6/1988 | Andrews et al. | 428/290 |
| 4,752,527 | 6/1988 | Sanzero et al. | 428/391 |
| 4,756,972 | 7/1988 | Kloosterboer et al. | 428/417 |
| 4,849,462 | 7/1989 | Bishop | 522/97 |
| 4,884,866 | 12/1989 | Hashimoto et al. | 350/36.34 |
| 4,891,241 | 1/1990 | Hashimoto et al. | 427/44 |

FOREIGN PATENT DOCUMENTS 50-50182   5/1975   Japan .

*Primary Examiner*—Charles R. Nold
*Attorney, Agent, or Firm*—Fishman, Dionne & Cantor

[57] ABSTRACT

Coated glass containers having a surface cured composition which is the reaction product of at least one ethylenically unsaturated monoene, a polyene and a curing initiator. The coating is bonded to the exterior or interior surface of a glass container to increase hardness and strength.

6 Claims, No Drawings

5,455,087

COATING COMPOSITION FOR GLASS CONTAINERS

This is a continuation of application Ser. No. 07/635,997, filed on Dec. 28, 1990, now abandoned which is a division of Ser. No. 272,133, filedon Nov. 16, 1988, now U.S. Pat. No. 5,112,658.

FIELD OF THE INVENTION

The present invention relates to curable exterior protective coating compositions for glass containers which include at least one monoene, a polyene and a curling initiator. As desired, additives of various structures may be incorporated into the carbon chains of the monoene and/or polyene components to provide such properties as increased strength,, water resistance, thermal stability and optical qualities to the resultant compositions.

RELATED PATENT

This application includes subject matter that formed a part of application Ser. No. 722,828, filed Apr. 17, 1985, now U.S. Pat. No. 4,707,076 issued Nov. 17, 1987.

BACKGROUND OF THE INVENTION

It is well known that functional protective overlayers of curable synthetic organic coating compounds are formed with thiols or polythiols as necessary components. The thiol or polythiol components of the prior art compoents, provide for the formation of solid, self-supporting cured compounds under ambient conditions in the presence of a free radical generator or under high energy irradiation. Illustrative of such known compounds are those disclosed in U.S. Pat. Nos. 4,125,644, 3,787,303, 3,662,022 and 3,864,229.

Glass containers are produced by two general methods that cause surface flaws to develop which significantly decrease mechanical strength of the container. In one method, the container is formed by forcing air into molten glass so that the outside surface of the glass is pressed against a mold. Flaws consequently predominate on the exterior surface of the finished product. Another method is to insert a metal die into molten glass resulting in flaws on the interior glass surface. Glass containers produced by either method are subject to exterior damage during subsequent handling after the forming process is complete.

OBJECTS OF THE INVENTION

Coatings for glass bottles have been the subject of much attention in the industry. Mechanical weakening can occur in glass as a result of flaws and scratches in the surface, even those of microscopic size, and as a result of moisture which attacks the bonding of the silica and other compounds which may be present in the glass.

In glass bottle technology, certain metal oxide and organic coating combinations, for example, tin oxide/polyethylene, have been used to reduce frictive damage in bottle contact and provide a barrier to moisture. While those coatings reduce stress in bottle contact and provide some protection from moisture, they do little to improve the strength of bottles already damaged and weakened, and also provide some difficulties in printing over the coatings.

It is an object of the present invention to provide a new and useful class of exterior or interior coating compositions which, when cured, provide enhanced physical, bonding and mechanical properties and consistency of these properties to glass containers.

It is still another object of the present invention to provide a composition which can form a highly crosslinked structure by exposure to high energy irradiation, thermal curing or moisture curing.

Still another object of this invention is to provide a coating composition with improved hydrolyric stability and adhesion promoting properties with oxidizable substrates.

It is still another object of the invention to provide curable coating compositions which do not require a thiol or polythiol as a synergist.

Other objects will be in part obvious and in part pointed out in more detail hereinafter.

A better understanding of the objects, advantages, features, properties and relations of the invention will be obtained from the following detailed description which sets forth certain illustrative embodiments and is indicative of the various ways in which the principles of the invention are employed.

SUMMARY OF THE INVENTION

The curable compositions disclosed in this invention have as the main components: (1) at least one monoene; (2) polyene; and (3) a curing initiator, such as a UV photoinitiator. The percent levels of each of these components can be varied relative to one another over a wide range. Organo functional groups can be integrated into the carbon chains of these main components to form compositions having a wide variety of applications. The components are combined and cured in an efficient manner without requiring a thiol or polythiol to act as the synergist for the composition. Curing mechanisms include radiation, thermal and moisture curing. The glass substrate is preferably a silica-containing glass and may be in a wide variety of shapes including bottles, plates, tubes and other glass containers.

One application of these general compositions to fiber optic cores is U.S. Pat. No. 4,707,076 granted to the inventors named herein.

DETAILED DESCRIPTION OF THE INVENTION AND PREFERRED EMBODIMENTS

The curable compositions may be composed of polymerizable monoenes including mixtures of two, three or more monoenes. As used herein, monoenes refer to simple and complex ethylenically unsaturated species having one reactive carbon-to-carbon bond per average molecule. Examples of operable monoenes are the mono unsaturated esters, ethers, amines and silanes, esters of mono unsaturated acids such as acrylic acid, methacrylic acid, butenoic acid, crotonic acid, itacontic acid, maleic acid, ethacryltc acid and the salts thereof, acrylates and methacrylates, along with the esters of mono unsaturated alcohols such as allylester and vinylesters. Specifically, monoenes useful herein include, but are not limited to, dimethyl itaconate, 1H, 1H, 11H-perfluoroundecyl methyl itaconate, di-1H, 1H, 11H-perfluoroundecyl maleate, perfluoroundecyl crotonate, crotyl perfluoro octanoate, isobornyl acrylate, isocyanatoethyl methacrylate, iso-octylacrylate, n-lauryl acrylate, butanediol acrylate, decyl acrylate, perfluoro-octyl acrylate trihydroeicosafluoroundecylacylate, gamma-methacryloxypropyltrimethoxysilane, 2 - hydroxy-2methyl-1-phenylpropan-1-one, 3-methacryloxypropyl-tris (methoxyethoxy-silane) and the urethane of isocyanatoethyl methacrylate and the like, including blends thereof. The various monoenes may be obtained commercially or may be readily prepared from commercially available reactants. Useful weight percentages of the composition for the monoene component are from about 10.0% to about 95.0%, with preferred a range of about 10.0% to about 75.0%.

The properties of the compositions can be modified by mixing two or more monoenes or by the integration of various functional groups into the monoene basic structure. The composition will then be made up of differing functional units and the properties of the resultant composition can be varied, in this way.

This can be done, for instance, by including in the composition a halogenated monoene such as a fluorinated monoene, can be readily incorporated into the composition when a low coefficient of friction is desired; the addition of a fluorinated compound will increase the thermal stability and electrical resistivity of the resultant composition.

Yet another example of the versatility of the composition of this invention is illustrated in TABLE I.

Table I indicates successful combinations of the composition invention wherein the resultant hardness of the composition (after curing) can be modified by the choice of components and/or the percentages of components. Specifically, the test results shown in TABLE I illustrates the results of the hardness testing when the monoene component was varied by several different methods, such as weight percent, chemical structure and balancing the combinations of monoenes, to produce compositions of varying hardness.

TABLE I

A. Constant percentage of monoene, different combinations of monoene.

| | Weight Precentage | Compound Composition | A-2 Scale Shore hardness |
|---|---|---|---|
| 1. | 90.0 | isodecyl acrylate | 31.0 |
| | 9.3 | trimethylolpropane triacrylate | |
| | 0.7 | 2 hydroxy-2-methyl-1-phenylpropan-1-one | |
| 2. | 68.0 | isodecyl acrylate | 42.0 |
| | 3.0 | isobornyl acrylate | |
| | 9.3 | trimethylolpropane triacrylate | |
| | 0.7 | 2-hydroxy-2-methyl-1-phenylpropan-1-one | |
| 3. | 23.0 | isodecyl acrylate | 93.0 |
| | 8.0 | isobornyl acrylate | |
| | 9.3 | trimethylolpropane triacrylate | |
| | 0.7 | 2-hydroxy-2-methyl-1-phenylpropan-1-one | |
| 4. | 90.0 | isobornyl acrylate | 94.7 |
| | 9.3 | trimethylolpropane triacrylate- | |
| | 0.7 | 2-hydroxy-2-methyl-1-phenylpropan-1-one | |

B. Different Percentage of Monoene and Combinations of monoenes.

| | Weight Precentage | Compound Composition | A-2 Scale Shore hardness |
|---|---|---|---|
| 1. | 73.8 | isodecyl acrylate | 78.0 |
| | 25.4 | trimethylolpropane triacrylate | |
| | 0.7 | 2-hydroxy-2-methyl-1-phenylpropan-1-one | |
| 2. | 55.0 | isodecyl acrylate | 83.0 |
| | 19.0 | isobornyl acrylate | |
| | 25.4 | trimethylolpropane triacrylate | |

TABLE I-continued

| | | | |
|---|---|---|---|
| | 0.7 | 2-hydroxy-2-methyl-1-phenylpropan-1-one | |
| 3. | 55.0 | isobornyl acrylate | 90.0 |
| | 19.0 | isodecyl acrylate | |
| | 25.35 | trimethylolpropane triacrylate | |
| | 0.7 | 2-hydroxy-2-methyl-1-phenylpropan-1-one | |
| 4. | 73.8 | isobornyl acrylate | 94.0 |
| | 25.4 | trimethylolpropane triacrylate | |
| | 0.7 | 2-hydroxy-2-methyl-1-phenylpropan-1-one | |

C. Different Percentage of Same Monoene.

| | Weight Precentage | Compound Composition | D-2 Scale Shore hardness |
|---|---|---|---|
| 1. | 90.0 | isodecyl acrylate | 6.0 |
| | 9.3 | trimethylolpropane triacrylate | |
| | 0.7 | 2-hydroxy-2-methyl-1-phenylpropan-1-one | |
| 2. | 73.8 | isodecyl acrylate | 25.0 |
| | 25.5 | trimethylolpropane triacrylate | |
| | 0.7 | 2-hydroxy-2-methyl-1-phenylpropan-1-one | |
| 3. | 50.0 | isodecyl acrylate | 70.0 |
| | 49.3 | trimethylolpropane triacrylate | |
| | 0.7 | 2-hydroxy-2-methyl-1-phenylpropan-1-one | |
| 4. | 10.0 | isodecyl acrylate | 82.0 |
| | 89.3 | trimethylolpropane triacrylate | |
| | 0.7 | 2-hydroxy-2-methyl-1-phenylpropan-1-one | |

The hardness of the compositions was determined by the Shore Hardness test under either the A-2 or D-2 scale. As can be seen from the above information, the hardness Is controlled by the several different factors to produce tailored compositions for a desired use. Moreover, the results of Table I illustrate the fact that the other properties of compositions, mentioned above, can be tailored to obtain desired characteristics for the composition on a chosen substrate.

Other organofunctional compounds or complexes can be substituted in the basic monoene component. By substituting a silane compound as a coupling agent, compositions suitable for use in bonding substrate materials can be produced. Alkoxy or hydroxy functional group may also be integrated into the monoene or polyene component to generate bonding to glass. Examples of such organofunctional silanes include gamma-methacryloxypropyltrimethoxy silane, 3-cyanopropyl triethoxy silane, gamma-glycidoxypropyl trimethoxy silane, trimethoxysilypropyl diethylene triamine, 3-chloropropyl trimethoxy silane, alkyl-alkoxy derivatives, and preferably gamma-mercaptopropyltrimethoxy silane, vinyltrimethoxy silane, m, p-styrylethylenetrimethoxy silane, allyl triethoxy silane, diphenylvinylethoxy silane, and alkoxy derivatives.

Similarly, other functional groups can be added to modify the properties of any given composition having the basic three components. The flame retardancy of the composition can be increased by the addition of fluorine and/or other halogens, while the water repulsion of compositions can be enhanced by incorporating alkyl chains of greater than six carbon lengths.

Additionally, compositions to be cured in accord with the present invention may, if desired, include such additives as antioxidants, inhibitors, activators, fillers, pigments, dyes, antistatic agents, flame retardant agents, thickeners, surface-active agents, viscosity modifiers, plasticizers and the like within the scope of the invention. The type and concentrations of the additives, and/or combinations must be selected with care so that the final compositions has the desired characteristics while remaining curable by free radical mechanisms or by other well-known curing means such as moisture curing.

The polyene component may be a simple or complex organic compound having a multiplicity of functional groups per molecule, and as with the monoene component, may be tailored by substitutions of organo functional compounds for controlling the resultant characteristics Of the composition. The term polyene is used herein to define ethylenically unsaturated compounds which contain at least 2 or more reactive unsaturated carbon-to-carbon bonds per molecule. The preferred polyenes are characterized by the ability to quickly thermoset upon exposure to the curing activity. Preferably the polyene component has two or more reactive unsaturated carbon-to-carbon bonds located terminally or pendant from the main carbon,chain.

Examples of such polyenes include, divinyl benzene, diallyl esters of polycarboxylic acids, triallyl terephthalate, N,N'-methylene diacrylamide, diallyl maleate, diallyl fumarate, divinyl adipate, diallyl succinate, divinyl ether, the divinyl ethers of ethylene glycol or diethylene glycol diacrylate, polyethylene glycol diacrylates or methacrylates and the like of the aforementioned cross linking monoenes. The most preferred include trimethylolpropane triacrylate, triallyl cyanurate, pentaerythritol acrylate, 1,3butanediol diacrylate and 1,6hexanediolacrylate. Other specific examples of commercially available polyenes include, but are not limited to allyl acrylate, allyl methacrylate and N, N'-methylene diacrylamide, and divinylbenzene and the like. Another, class of polyenes which are particularly useful are the polyurethanes which contain sufficient reactive carbon-to-carbon locations for the placement of other functional or additive groups.

Useful ranges of the polyene component are from about 2.0% to about 70.0% of the weight percent of composition, and preferably from about 10.0% to about 60.0%.

Practically any curing initiator agent or curing rate accelerator can be used. UV curing is often preferred, although it is recognized that free radical generating reagents may be employed as well as high energy radiation bombardment and thermal curing. Curing rate accelerators useful herein include 2-hydroxy-2-methyl-1-phenyl propan-1-one, methyl, ethyl, propyl or isobutyl ethers of benzoin and other analogs, and 2,2-dimethoxy, 2-phenyl-acetophenone. The curing agent may be included in any effective amount; generally, suitable levels are from about 0.4% to about 20% of the weight composition of composition, and preferably from about 0.7% percent by weight of the composition to about 10%. If thermal curing is employed, an appropriate initiator such as a peroxide or Azo compound may be added.

The following Table II indicates representative examples of successful combinations of compositions formed accordance with this invention.

TABLE II

| Components/Composition | 1 | 2 | 3 | 4 | 5 | 6 | 7 | 8 | 9 | 10 | 11 | 12 | 13 |
|---|---|---|---|---|---|---|---|---|---|---|---|---|---|
| Dimethyl Itaconate | 46.1 | 56.3 | | | | | | | | | | | |
| 1H, 1H, 11H-Perfluoroundecyl Methyl Itaconate | | | 37.8 | 50.9 | | | | | | | | | |
| Di-1H, 1H, 11H-Perfluoroundecyl Maleate | | | | | 56.3 | | | | | | | | |
| Perfluoroundecyl Crotonate | | | | | | 50.0 | 56.3 | | | | | | |
| Crotyl Perfluoro octanoate | | | | | | | | | | | | | |
| Acrylate FX-13 | | | | | | | | 66.7 | 36.2 | | | | |
| Methacrylate FX-14 | | | | | | | | | | | | | |
| Isobornyl Acrylate | | | 13.1 | | | | | | | | | | |
| Isocyanato Ethyl Methacrylate | | | | | | | | | | 36.0 | 73.0 | | |
| Urethane of Isocyanatomethacrylate | | | | | | | | | | | | 71.8 | 36.1 |
| Iso-Octyl Acrylate | | | | | | | | | | | | | |
| 1H, 1H, 11H-Bicosafluoromdecyl Acrylate | | 18.8 | | | 18.8 | | 18.8 | | 36.2 | 36.0 | | | 36.1 |
| trimethylolpropane triacrylate | 49.8 | 22.8 | 46.5 | 46.5 | 22.8 | 45.5 | 22.8 | 31.3 | 25.4 | 25.7 | 24.5 | 23.9 | 25.4 |
| -Methacryloxypropyltrimethoxy silane | 2.8 | 1.5 | 1.8 | 1.7 | 1.5 | 3.0 | 1.5 | 1.3 | 1.5 | 1.4 | 1.5 | 2.9 | 1.5 |
| hydroxy-2-ethyl-1-phenylpropan-1-one | 1.4 | .75 | .9 | .9 | .8 | 1.5 | .75 | .7 | .7 | 1.0 | .9 | 1.4 | 1.0 |
| 3-Methacryloxy propyltris (methoxy ethoxy silane) | | | | | | | | | | | | | |

| Components/Composition | 14 | 15 | 16 | 17 | 18 | 19 | 20 | 21 | 22 | 23 | 24 | 25 | 26 | 27 |
|---|---|---|---|---|---|---|---|---|---|---|---|---|---|---|
| Dimethyl Itaconate | | | | | | | | | | | | | | |
| 1H, 1H, 11H-Perfluorodecyl Methyl Itaconate | | | | | | | | | | | | | | |
| Di-1H, 1H, 11H-Perfluoroundecyl Maleate | | | | | | | | | | | | | | |
| Perfluoroundecyl Crotonate | | | | | | | | | | | | | | |
| Acrylate FX-13 | | | | | | | | | | | | | | |
| Methacrylate FX-14 | | | | | | | | | | | | | | |
| Isobornyl Acrylate | | | 47.0 | | 88.0 | | | | | | | | | |
| Isocyanato Ethyl Methacrylate | | | | | | | | | | | | | | |
| Iso Octyl Acrylate | | | | | | | | | | | | | | |
| Urethane of Isocyanatomethacrylate | | 71.1 | | | | | | | | | | | | |
| 1H, 1h, 11H-Eicosaflourotmdecyl Acrylate | 90.4 | | 47.0 | 10.0 | 89.0 | | 73.7 | 73.7 | 73.7 | 73.7 | 73.7 | | | |
| Crotyl Perfluoro Octanoate | | | | | | | | | | | | 48.0 | 48.3 | 39.8 |
| Allyl Acrylate | | | | | | | | | | | | | 0.7 | 13.9 |
| 5-Hexenyldimethylchlorosilane | | | | | | | | | 1.7 | | | | | |
| N(3 acryloxy-2-Hydroxy Propyl) 3 Amino propyltriethoxy silane | | | | | | | | | | | 1.7 | | | |

TABLE II-continued

| Components | | | | | | | | | | | | | | |
|---|---|---|---|---|---|---|---|---|---|---|---|---|---|---|
| 3-Methacryloxy Propyl-dimethyl Chlorosilane | | | | | | | | 1.7 | | | | | | |
| 1,3,5-Trivinyl 1,1,3,5,5-trimethyltrisiloxane | | | | | | | | | | 1.7 | | | | |
| 3-Methacryl propyl-tris Methoxy ethoxy silane | | | | | | | 1.7 | | | | | | | |
| trimethylolpropane triacrylate | 6.3 | 23.7 | 3.1 | 86.0 | 5.7 | 8.7 | 23.8 | 23.8 | 23.8 | 23.8 | 23.8 | | | 38.0 |
| -Methacryloxypropyltrimethoxy silane | 2.1 | 2.8 | 1.9 | 3.4 | 3.7 | 1.9 | | | | | | 3.8 | 6.2 | 4.8 |
| 3-Methacryloxy propyl tris (methoxy ethoxy silane) | 1.2 | 2.4 | 0.9 | 1.1 | 1.7 | 1.7 | 0.7 | 0.7 | 0.7 | 0.7 | 0.7 | 1.4 | 1.4 | 3.2 |
| Triallyl cyanurate | | | | | | | | | | | | | 47.0 | 43.4 |

| Components/Composition | 28 | 29 | 30 | 31 | 32 | 33 | 34 | 35 | 36 | 37 |
|---|---|---|---|---|---|---|---|---|---|---|
| Dimiethyl Itaconate | | | | | | | | | | |
| 1H, 1H, 11H-Perfluoroundecyl Methyl Itaconate | | | | | | | | | | |
| D1-1H, 1H, 11H-Perfluorotrndecyl Maleate | | | | | | | | | | |
| Perflouroundecyl Crotonate | | | | | | | | | | |
| Acrylate FX-13 | | | | | | | | | | |
| Methacrylate FX-14 | | | | | | 50.0 | 25.0 | | | |
| Isobornyl Acrylate | | | | | | | | | | |
| Isocyanato Ethyl Methacrylate | | | | | | | | | | |
| Iso-Octyl Acrylate | | | | | | | | | | |
| Urethane of Isocyanomethacrylate | | | | | | | | | | |
| 1H, 1H, 11H-Eicosafluorotrndecyl Acrylate | | | | | | | 25.0 | 50.0 | 50.0 | 74.0 |
| Crotyl Perfluoro Octanoate | 28.7 | | | 22.0 | 14.6 | | | | | |
| Allyl Acrylate | 36.0 | | | 27.5 | 35.0 | | | | | |
| Octyl Crotonate | | 48.5 | 50.0 | | | | | | | |
| trimethylolpropane triacrylate | | 46.0 | 45.0 | | 17.6 | 45.5 | 45.5 | 46.0 | | 24.0 |
| -Methacryloxypropyltrimethory silane | 2.9 | 3.9 | 3.0 | 1.3 | 2.5 | 3.0 | 3.0 | 3.0 | 3.0 | |
| 2-hydroxy-2-methyl-1-phenylpropantone | 1.7 | 1.5 | 1.5 | 1.5 | 15.0 | 1.5 | 1.5 | 1.5 | 1.5 | 1.7 |
| 3-Methacryloxy propyl tris (methoxy ethoxy silane) | | | | | | | | | | |
| Triallyl Cyanurate | 30.7 | | | 48.0 | 15.0 | | | | 46.0 | |

The following examples are also illustrative of the present invention and are not intended to limit the scope thereof.

EXAMPLE I

A three component curable system was prepared as follows:

A receptacle suitable for preparing a 10 gram batch, equipped with a stirring bar, was charged with the following components in weight percentage in sequence:

| | |
|---|---|
| vinyl trimethyloxy silane | 12.0% |
| trimethylolpropane triacrylate | 87.0% |
| 2-hydroxy-2-methyl-1-phenylpropan-1-one | 1.0% |

After the addition was completed the compositions was thoroughly mixed and UV cured on a substrate.

EXAMPLE 2

The procedures of Example 1 were substantially repeated except a fourth component was added the following components was added to the hatching receptacle.

| | |
|---|---|
| allylphenylether | 10.0% |
| gamma-methacryloxypropyltrimethoxy silane | 2.0% |
| trimethylolpropane triacrylate | 87.0% |
| 2-hydroxy-2-methyl-1-phenylpropan-1-one | 1.0% |

EXAMPLE 3

The procedures of Example 2 were substantially repeated except the following components were added to the receptacle.

| | |
|---|---|
| lauryl acrylate | 10.0% |
| trimethylolpropane triacrylate | 87.0% |
| gamma-methacryloxypropyltrimethoxy silane | 2.0% |
| 2-hydroxy-2-methyl-1-phenylpropan-1-one | 1.0% |

After the monoene, polyene and curing initiator components are combined and blended, and if desired, additional functional materials (as may be desired), the curable coating composition is applied to a substrate and thereafter exposed to a free radical generator such as actinic radiation to give an essentially solid overcoating to a substrate.

EXAMPLE 4

The procedures of Example 3 were substantially repeated except the following components were added to the receptacle.

| | |
|---|---|
| n-lauryl methacrylate | 8.5% |
| gamma-methacryloxypropyl (trimethoxy-) silane | 1.5 |
| 1,3 Butyleneglycoldimethacrylate | 62.7 |
| trimethylolpropaetriacrylate | 23.1 |
| 1,1 Azobis (cyanocyclohexane) | 4.0 |
| thiodiethylene bis-(3,5;-tert-butyl-4 hydroxy hydrocinnamate) | 0.2 |

The curing reaction is preferably initiated by either

UV/VIS radiation or high energy ionizing radiation. The UV radiation can be obtained by special light sources which emit significant amounts of UV light having a wavelength in the range of about 2000 to about 4000 Angstrom units. When UV radiation is used for a curing reaction, a dose of about 50 to 250 watts/in$^2$ is employed.

The curing rate of the UV curable compositions is dependent upon the intensity of UV light which initiates cross linking within the composition. UV lamp systems are available in a wide range of power output and bulb lengths to provide the desired rate for each separate application.

When UV radiation is used for curing a composition, a photosensitizer may be added to the composition.

The present curable coating compositions provide improved mechanical strength widen used on a typical glass substrate such as soda lime silica container glass. Such mechanical strength factors as burst-strength, resistance to abrasion, and general container strength are significantly improved.

As will be apparent to persons skilled in the art, various modifications, adaptations and variations of the foregoing specific disclosure can be made without departing from the teachings of this invention.

I claim:

1. A glass container having increased strength which is produced by the method consisting essentially of applying a coating material consisting essentially of a silane coupling agent in the form of gamma-methacryloxypropyl-trimethoxy silane and a reactive compound having at least two (meth)acryloyl groups in the molecule to the surface of the glass container, and then subjecting the coated glass container to energy to cure the coating.

2. The glass container of claim 1 wherein the energy is ultraviolet light.

3. A glass container having an increased pressure resistant strength which is produced by the method consisting essentially of applying a coating material consisting essentially of a silane coupling agent in the form of gamma-methacryloxypropyl-trimethoxy silane and a reactive compound having at least two (meth)acryloyl groups in the molecule to the surface of the glass container, and then subjecting the coated glass container to energy to cure the coating.

4. The glass container of claim 3 wherein the energy is ultraviolet light.

5. A glass container having an increased pressure resistant strength and impact strength which is produced by the method consisting essentially of applying a coating material consisting essentially of a silane coupling agent in the form of gamma-methacryloxypropyl-trimethoxy silane and a reactive compound having at least two (meth)acryloyl groups in the molecule to the surface of the glass container, and then subjecting the coated glass container to irradiation of an activated energy ray to cure the coating.

6. The glass container of claim 5 wherein the activated energy ray is ultraviolet light.

* * * * *